United States Patent [19]

Matsunawa et al.

[11] Patent Number: 4,495,522
[45] Date of Patent: Jan. 22, 1985

[54] RECORDING APPARATUS AND METHOD OF PICTURE IMAGE

[75] Inventors: Masahiko Matsunawa; Yoshinori Abe, both of Tokyo, Japan

[73] Assignee: Konishiroku Photo Industry Co., Ltd., Tokyo, Japan

[21] Appl. No.: 395,638

[22] Filed: Jul. 6, 1982

[30] Foreign Application Priority Data

Jul. 7, 1981 [JP] Japan ................................ 56-105030
Sep. 3, 1981 [JP] Japan ................................ 56-137722

[51] Int. Cl.³ .............................................. H04N 1/40
[52] U.S. Cl. ..................................... 358/280; 358/283
[58] Field of Search ............... 358/280, 283, 298, 282, 358/284

[56] References Cited

U.S. PATENT DOCUMENTS

| | | | |
|---|---|---|---|
| 4,251,837 | 2/1981 | Janeway | 358/280 |
| 4,258,393 | 3/1981 | Ejiri | 358/280 |
| 4,288,821 | 9/1981 | Lavallee | 358/293 |
| 4,349,846 | 9/1982 | Sekigawa | 358/280 |
| 4,414,581 | 11/1983 | Kato | 358/280 |

Primary Examiner—Howard W. Britton
Attorney, Agent, or Firm—James E. Nilles; Thomas F. Kirby

[57] ABSTRACT

A method of and apparatus for recording picture image wherein by a memory circuit are memorized a plurality of matrix groups each having a plurality of threshold values with a predetermined density distribution arrayed according to a predetermined order, by a circuit is divided a picture image to be recorded into a plurality of picture regions and is obtained picture density data for each of the regions is obtained, by a matrix selecting circuit is selected from the plurality of matrix groups memorized in the memory circuit matrices corresponding to the picture density data detected for each of the regions, and by a comparator is compared each picture element level of electric signals indicating a picture image information with each threshold value of the matrix selected by the matrix selecting means and is generated an output binary signals thereof.

4 Claims, 19 Drawing Figures

F I G. 1
$$D^4 = \begin{Bmatrix} 0 & 8 & 2 & 10 \\ 12 & 4 & 14 & 6 \\ 3 & 11 & 1 & 9 \\ 15 & 7 & 13 & 5 \end{Bmatrix}$$
F I G. 2 (A)
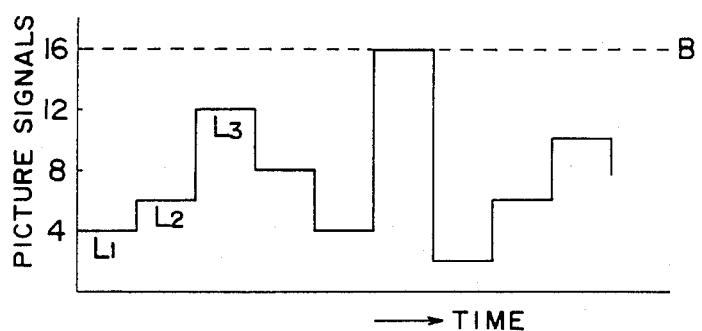
F I G. 2 (B)
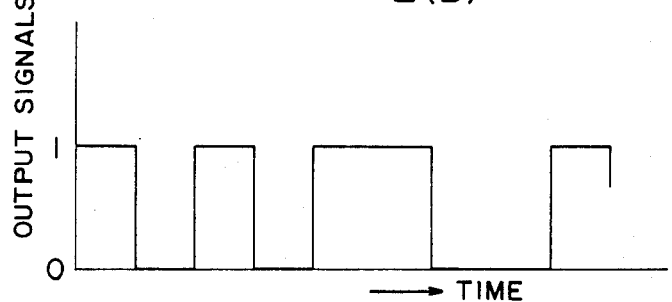

FIG. 8(A)
| | | | | | | | |
|---|---|---|---|---|---|---|---|
| 0.984 | 0.287 | 0.644 | 0.203 | 0.821 | 0.265 | 0.601 | 0.183 |
| 0.127 | 0.496 | 0.057 | 0.383 | 0.109 | 0.465 | 0.04 | 0.357 |
| 0.564 | 0.165 | 0.749 | 0.244 | 0.529 | 0.146 | 0.692 | 0.223 |
| 0.024 | 0.334 | 0.092 | 0.437 | 0.008 | 0.310 | 0.074 | 0.409 |
| 0.781 | 0.254 | 0.582 | 0.174 | 0.874 | 0.276 | 0.622 | 0.193 |
| 0.1 | 0.45 | 0.032 | 0.345 | 0.118 | 0.48 | 0.049 | 0.37 |
| 0.468 | 0.136 | 0.667 | 0.213 | 0.546 | 0.155 | 0.719 | 0.234 |
| 0.008 | 0.299 | 0.086 | 0.396 | 0.016 | 0.322 | 0.083 | 0.423 |
FIG. 8(B)
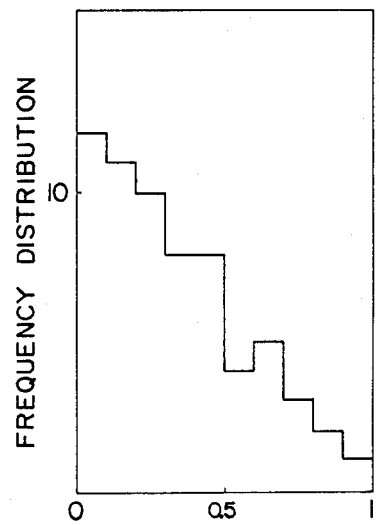
FIG. 8(C)
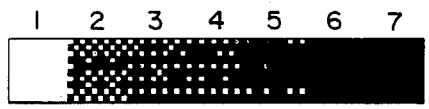

FIG. 9(A)
| 0 | 0.713 | 0.356 | 0.797 | 0.179 | 0.735 | 0.399 | 0.817 |
| 0.873 | 0.504 | 0.943 | 0.617 | 0.891 | 0.535 | 0.96 | 0.643 |
| 0.436 | 0.836 | 0.251 | 0.756 | 0.471 | 0.854 | 0.308 | 0.777 |
| 0.976 | 0.666 | 0.908 | 0.563 | 0.992 | 0.69 | 0.926 | 0.591 |
| 0.219 | 0.746 | 0.418 | 0.830 | 0.127 | 0.724 | 0.378 | 0.807 |
| 0.90 | 0.55 | 0.968 | 0.655 | 0.882 | 0.520 | 0.951 | 0.630 |
| 0.532 | 0.864 | 0.333 | 0.787 | 0.454 | 0.845 | 0.281 | 0.766 |
| 0.984 | 0.701 | 0.934 | 0.604 | 0.984 | 0.678 | 0.917 | 0.577 |
FIG. 9(B)
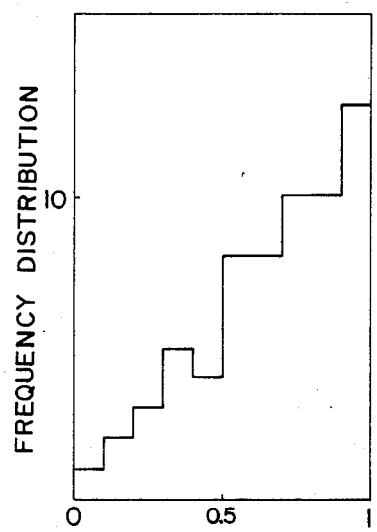
FIG. 9(C)
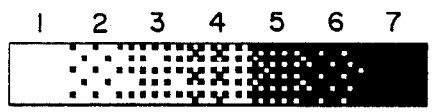
FIG. 10
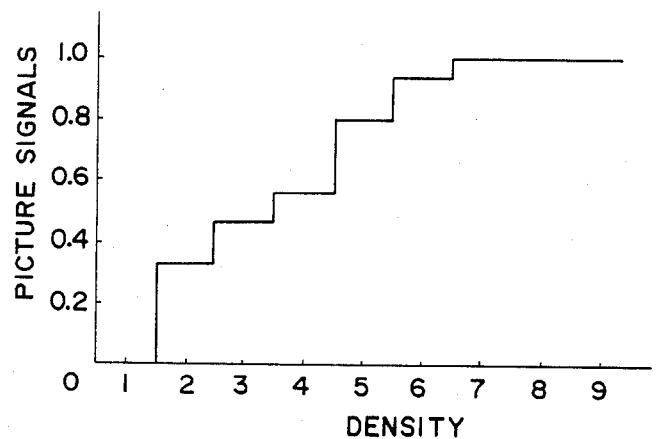

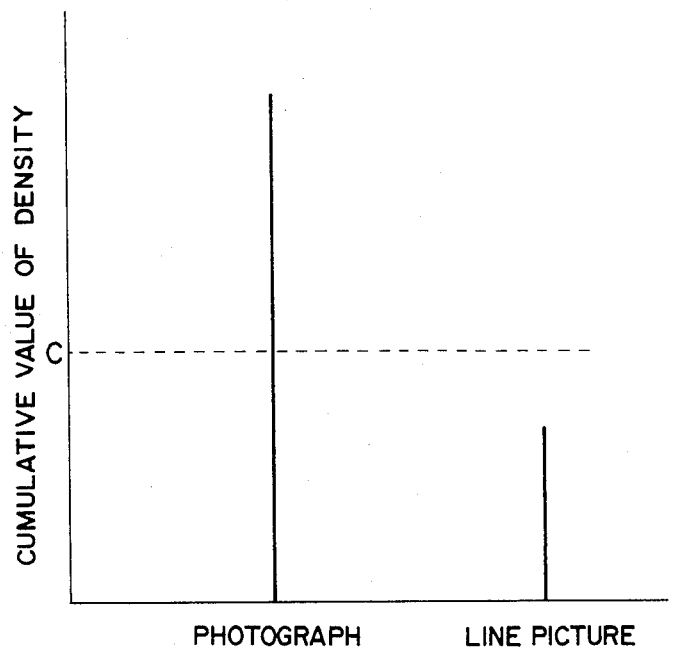
F I G. 13

RECORDING APPARATUS AND METHOD OF PICTURE IMAGE

BACKGROUND OF THE INVENTION

1. Field of the Invention

The present invention relates to recording apparatus for and method of picture image which improves picture quality, particularly the reproducibility of fine lines, as a result of recording the data by varying the gradation depending upon whether the data to be recorded consists of lines or is a photograph.

2. Description of the Prior Art

A known recording method consists of converting picture data into electric signals, and recording picture image by the electric signals, as employed in some electrophotographic reproducing machines and facsimiles. In this kind of recording method, the electric signals which represent picture data are treated in the form of binary (1, 0) signals from the standpoint of easy signal processing, and the picture is recorded as a black-and-white picture. When it is desired to record the picture with gradations in several stages from white to black, however, the electric signals are treated to produce intermediate tones between white and black. Various methods for recording the picture with gradation have heretofore been known, such as (1) a simulation screen process in which the size (diameter) of black dots forming the picture is changed, or the density of dots of a predetermined size is changed, (2) a Dither method in which the level of picture elements in the picture signals is compared with a predetermined threshold value, and the signals are converted into binary values (0, 1) depending upon the level, and (3) a density pattern method in which the kind of dot pattern is switched to express light and shade depending upon the portions where the brightness of the picture changes steeply and the portions where the brightness of the picture changes mildly, in order to clearly present contours.

Among the above-mentioned gradation recording methods, the Dither method further includes a systematic Dither method in which numerical values (threshold values) sampled at equal intervals up to a predetermined value are arrayed according to a predetermined rule to form a matrix (Dither matrix), levels of picture elements in the picture signals are compared with numerical values at corresponding positions in the matrix, and whether or not the picture elements should be recorded is determined relying upon the level. It has been known that the systematic Dither method can easily offer picture of good quality. The emphasize contrast in the gradation method based on the systematic Dither method, threshold values constituting the matrix are increased and decreased uniformly or increased by predetermined values. To obtain fine gradations in which light and shade change smoothly by this method, however, complicated pre-treatment must be carried out.

In order to simply process the picture in real time, therefore, a method of recording a picture image has been contemplated, according to which provision is made of a plurality of matrices which consist of a plurality of threshold values with predetermined frequency distribution arrayed according to a predetermined order, the level of each picture element in the electric signals representing the picture data is compared with each threshold value in the matrix, and the picture is recorded based upon the picture signal which is produced when the level of the picture elements is greater than the threshold value.

The picture image of the original to be recorded may consist of a picture (line) made up of fine lines, or a picture (photograph) having a wide range of density regions, or a combination of these two kinds of pictures. According to the above-mentioned method of recording a picture image, however, a suitable matrix is selected among Dither matrices which have been prepared beforehand depending upon whether the picture of the original pertains to a line picture of a photograph, the level of each picture element in the electric signals representing the picture data is compared with each threshold value in the selected Dither matrix, and the picture is recorded based on binary signals which are formed relying upon the compared results. Therefore, there is no problem when the picture is either a line picture or a photograph. But when the picture consists of a combination of a line picture and a photograph, selection of a Dither matrix suited for either one of them deteriorates the quality of the other part, making it difficult to maintain high quality over the whole picture to be recorded.

SUMMARY OF THE INVENTION

The object of the present invention is to provide a method or recording a picture image, in which a plurality of matrices having different frequency distributions of threshold values are prepared in order to improve the quality of the recorded picture, the picture to be recorded is divided into a plurality of picture regions, picture density data in the picture regions is obtained from the picture signals that represent each of the picture regions, the picture signals are converted into binary signals for the picture density data detected for each of the picture regions by using a predetermined matrix from among the plurality of matrices, and the picture is recorded according to the picture signals which are converted into binary signals.

The above recording method, however, has the problem that lines of the picture often disappear particularly in the picture regions where many lines are contained. That is, fine lines are not properly reproduced. This is because, when the optical data from the line picture is converted into binary signals according to the Dither matrix, the output is zero when a large threshold value in the matrix is compared with the picture signal. The optical data from fine lines is not regarded as a high density picture element even though the line itself may have a high density. When the optical data is converted into binary signals using the Dither matrix, therefore, the lines often disappear as described above.

In view of the above-mentioned repects, therefore, another object of the present invention is to provide a method of recording a picture image in which, in order to improve reproducibility of fine lines, it is discriminated from the density data obtained from the picture to be recorded whether the picture to be recorded pertains to a photograph or a line picture, the picture signals are converted into binary signals using a matrix when the picture is a photograph, the picture signals are simply converted into binary signals without using a matrix when the picture is a line picture, and the picture is recorded based upon the picture signals which are converted into binary signals.

Further objects and features of the invention will become obvious from the following description taken in conjunction with the accompanying drawings.

BRIEF DESCRIPTION OF THE DRAWINGS

FIG. 1 shows a Dither matrix employed in a systematic Dither method;

FIG. 2(A) is a diagram illustrating input picture signals by the Dither method;

FIG. 2(B) is a diagram illustrating picture signals which have been gradated;

FIGS. 8(A) and 9(A) are diagrams illustrating Dither matrices;

FIGS. 8(B) and 9(B) are graphs showing the frequency distributions of threshold values in the Dither matrices of FIGS. 8(A) and 9(A);

FIGS. 8(C) and 9(C) are diagrams illustrating the recorded pictures;

FIG. 10 is a diagram illustrating electric picture signals that are to be recorded;

FIG. 13 is a diagram comparing the cumulative value of a line picture with the cumulative value of a photograph.

DESCRIPTION OF THE PREFERRED EMBODIMENTS

Prior to illustrating the present invention, how to form picture signals of various densities to be recorded according to a systematic Dither method will be discussed first.

FIG. 1 shows a Dither matrix determined according to the following formula with U and $D^2$ as basic units.

$$D^n = \begin{pmatrix} 4D^{\frac{n}{2}} & 4D^{\frac{n}{2}} + 2U^{\frac{n}{2}} \\ 4D^{\frac{n}{2}} + 3U^{\frac{n}{2}} & 4D^{\frac{n}{2}} + U^{\frac{n}{2}} \end{pmatrix}$$

$$U = \begin{pmatrix} 1 & 1 \\ 1 & 1 \end{pmatrix} \quad D^2 = \begin{pmatrix} 0 & 2 \\ 3 & 1 \end{pmatrix}$$

Here, the picture signals may be introduced as shown in FIG. 2(A). The level of each picture signal is compared with each threshold value in the Dither matrix. An output "1" is produced when the level of the picture signal is greater than the threshold value, and an output "0" is produced when the level of the picture signal is smaller than the threshold value. For instance, the level $L_1$ (4) of a picture signal is compared with 0 in the Dither matrix. In this case, the level of the picture signal is greater than 0 and, hence, the output "1" is produced. Next, the level $L_2$ (6) of a picture signal is compared with 8 in the Dither matrix. In this case, the level of the picture signal is smaller than 8 and, hence, the output "0" is produced. Then, the level $L_3$ (12) of a picture signal is compared with 2 in the Dither matrix. In this case, the level of the picture signal is greater than 2 and, hence, the output "1" is produced. Likewise, levels of the picture signals are compared with the corresponding threshold values in the Dither matrix to produce outputs "1" or "0" (here, the level of a picture signal which has reached 16 is treated as the maximum level B). FIG. 2(B) illustrates the signals thus produced; gradation is obtained if the picture is recorded using the output signals thus produced.

Figure 3:
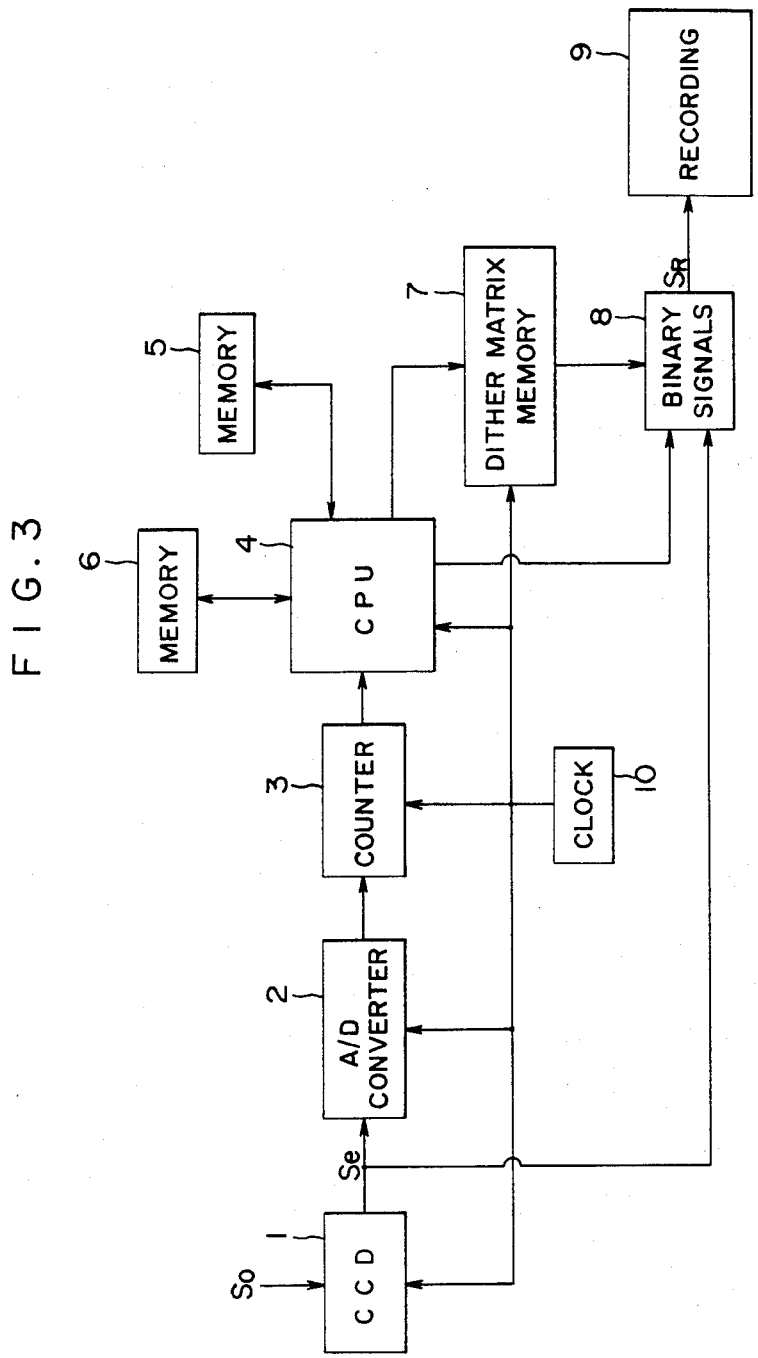
FIG. 3 is a diagram of a recording circuit for putting the method of recording a picture image according to an embodiment of the present invention into practice.

FIG. 3 is a block diagram of a recording circuit for putting the method of recording a picture image according to an embodiment of the present invention into practice. In FIG. 3, reference numeral 1 denotes a photoelectric converter element such as a CCD (charge coupled device) which converts the introduced optical data signal So into an electric picture signal Se, 2 denotes an analog-to-digital converter which converts the electric picture signal Se produced by the photoelectric converter element 1 into a digital signal for each of the picture elements, 3 denotes a counter which counts digital signals for each picture element produced by the analog-to-digital converter 2, 4 denotes a central processing unit (CPU) such as a microprocessor which stores the value counted by the counter 3 in a memory (RAM) 5, reads the data stored in the memory (RAM) 5 to add it, and executes the operation that will be described below to discriminate whether the picture data is a diagram consisting of lines or a photograph, 6 denotes a memory (ROM) which stores the operation program of the central processing unit 4, 7 denotes a memory unit for storing a plurality of Dither matrices consisting of a plurality of threshold values with a predetermined frequency distribution arrayed in a predetermined order, 8 denotes a circuit for converting the electric picture signal Se into a binary signal according to some Dither matrix stored in the memory unit 7, and 9 denotes a recording unit which records the picture based upon binary picture signals $S_R$ produced by circuit 8. Reference numeral 10 denotes a clock generator which produces pulses for controlling the exposure time of the photoelectric converter element 1, pulses for driving the shift register in the photoelectric converter element 1, clock signals for determining the conversion timing of the analog-to-digital converter 2, clock signals for determining the count timing of the counter 3, clock signals for timing the operation of the central processing unit 4 and for determining the timing of storing or reading data by the central processing unit 4, and clock signals for determining output timing of the memory unit 7.

Figure 4:
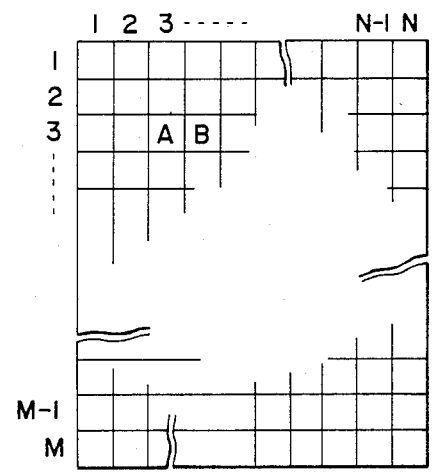
FIG. 4 is a diagram illustrating the original divided according to the method of recording a picture image of the present invention.

In the recording method of the present invention, the original picture to be recorded is divided into lateral blocks N (in the main scanning direction) and vertical blocks M (in the subscanning direction) as shown in FIG. 4, and it is discriminated whether the picture data contained in each block is a line picture or a photograph. The number of the blocks to be divided is arbitrarily determined depending upon the size of the original and content of the picture data, i.e., distribution of line picture and photograph or the fineness of the distribution. Here, however, the number of the blocks N, M will be selected to be 10 or a number close thereto.

Figure 5:
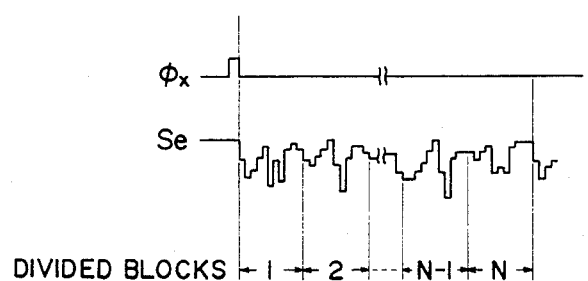
FIG. 5 is a diagram showing a relation between electric picture signals and divided blocks.
Figure 6:
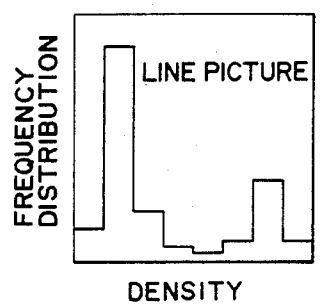
FIG. 6(A) is a histogram showing density vs. frequency distribution when the picture is a line picture.
FIG. 6(B) is a histogram showing the density vs. frequency distribution when the picture is a photograph.
Figure 6:
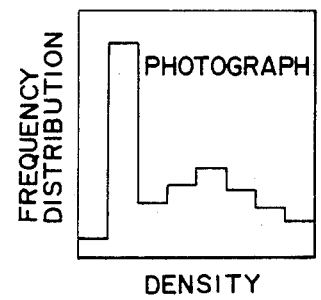

FIG. 5 shows some of the scanning of electric picture signals Se. To divide the original picture into N blocks in the lateral direction and to read picture density data for each block, a clock signal is produced by the clock generator 10 having a period 1/N of the pulse which controls the exposure time of the photoelectric converter element 1. The clock signal is used as a reset signal for the counter 3. The counted value (such as data consisting of 8 bits representing the density) of the electric picture signals Se is stored in the memory (RAM) 5 as the picture density data after the receipt of each reset signal for each block. The original picture is further divided into M blocks in the vertical direction to read picture density data for each block. To do this, the electric picture signals Se are counted by the counter 3 after each scanning, the counted value is stored in the memory (RAM) 5, and the scanning number is also counted. When the scanning number has reached a certain value (for example, 100 scanning) contained in one block in the vertical direction, the picture density data which had been stored in the memory (RAM) 5 for each block in the lateral direction is read, added for each density, and again stored in the memory (RAM) 5 for each block. FIG. 6 is a histogram of density prepared from the picture density data which has been stored in the memory (RAM) 5 for each of the blocks, wherein FIG. 6(A) is a histogram of density of a line picture, and FIG. 6(B) is a histogram of density of a photograph. In either histogram, a peak in the frequency distribution which corresponds to the background of the original (portions without either line picture or photograph) appears where the density is low.

The method of discriminating whether the picture data is that of the line picture or that of the photograph is described below.

The density bit having the greatest frequency distribution and the density bit having the second greatest frequency distribution are found for each block from the picture density data stored for each block in the memory (RAM) 5, and it is examined whether these two bits are contiguous or not. When the two bits are contiguous, the picture data of the block is discriminated to be that of the photograph. When the two bits are not contiguous, on the other hand, the picture data is discriminated to be that of a line picture. Further, the difference in the frequency distribution between neighboring bits is calculated. When the difference is smaller than a predetermined threshold value, on the average for each block, the picture data of the block is discriminated to be that of a photograph. When the difference is larger than the predetermined threshold value, on the other hand, the picture data of the block is discriminated to be that of a line picture. Discrimination between a line picture and a photograph, may depend on either one of the above methods or a combination of the two.

Figure 7:
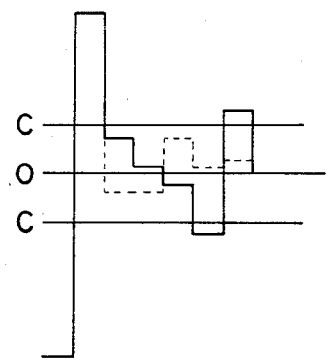
FIG. 7 is a diagram for discriminating between a photograph and a line picture.

When the above method cannot discriminate whether the picture data is that of a line picture or a photograph, it may be discriminated to be that of the photograph when there are a number greater than a predetermined value of density steps greater than a predetermined frequency (indicated by threshold value C) in the density histogram of FIG. 7. When the number of density steps greater than a predetermined frequency is not greater than the predetermined value (threshold value C), the picture data is discriminated to be that of a line picture.

A Dither matrix shown in FIG. 8(A) or a Dither matrix shown in FIG. 9(A) are stored beforehand in the memory unit 7. FIGS. 8(B) and 9(B) are graphs which show frequency distributions of threshold values in the Dither matrices of FIGS. 8(A) and 9(A), in which the abscissa represents the magnitude (0 to 1) of the threshold value, and the ordinate represents the number of threshold values included in the range of each of the threshold values.

Figure 11:
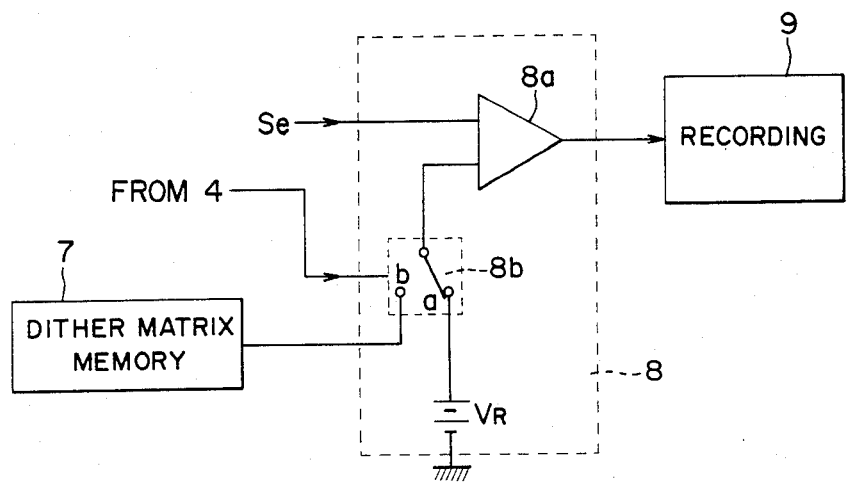
FIG. 11 is a diagram of a circuit for obtaining binary signals, employed for the recording circuit of FIG. 3.

FIG. 11 shows a circuit 8 which produces binary signals for use in the recording circuit of FIG. 3, which consists of a comparator 8a and a switch 8b. The comparator 8a converts the electric picture signals Se into binary signals by comparing them with a reference level determined by a reference voltage $V_R$ or with threshold values in the Dither matrix stored in the memory unit 7. The switch 8b is changed for each block according to the picture density data stored in the memory (RAM) 5. When the picture density data is that of a line picture the switch 8b is connected to a contact a, and when the picture density data is that of a photograph the switch 8b is connected to a contact b. The switch 8b is constructed so that it can be manually connected to the contact a at any time, so that circuit 8 can also be used for an ordinary recording operation without using a Dither matrix.

The recording method using this recording circuit will now be described with reference to FIG. 3.

An optical data signal So to be recorded is converted into an electric picture signal Se by the photoelectric converter element 1, and is produced in synchronism with pulses from the clock generator 10. The electric picture signal Se is converted by the analog-to-digital converter 2 into a digital signal (consisting, for example, of 8 bits) which represents the picture density data, and is counted by the counter 3 for each density (bit). The counting operation of the counter 3 is repeated upon receipt of each reset signal produced at a predetermined period by the clock generator 10. The counted value in one counting operation is stored in the memory (RAM) 5 as the picture density data of one scanning of a block in the lateral direction of the original. The picture density data is added for each block for a predetermined number of scannings, and is stored in the memory (RAM) 5. After completing the predetermined number of scannings, whether each block is a line picture or a photograph is discriminated according to the stored picture density data. Therefore, the discriminated result of whether it is a line picture or a photograph is stored in the memory (RAM) 5 for each block.

After whether each block is a line picture or a photograph has been discriminated and stored for all blocks N×M of the original, the electric picture signal Se is produced again. To do this, the optical data signal So may be applied to the photoelectric converter element 1 again, or the electric picture signal Se which has already been produced to discriminate whether each block is a line picture or a photograph may have been stored and be reproduced again. In either case, the picture data, i.e., the data of whether each block is a line picture or a photograph is read from the memory (RAM) 5 for each block in synchronism with the electric picture signal Se. Here, a Dither matrix is produced if it is a photograph. That is, in FIG. 4, if the picture data of a block A is that of the line picture, the switch 8b in the circuit 8 of FIG. 3 is changed to the contact a, whereby the electric picture signals Se are simply converted by the comparator 8a into binary signals without using a Dither matrix, and are produced as recording signals $S_R$.

When the picture data of a block B is that of a photograph, on the other hand, the switch 8b of the binary circuit 8 is switched to contact b, whereby the Dither matrix shown in FIG. 9(A) is sent from the memory unit 7 to the comparator 8a. Accordingly, the electric picture signals Se are converted into binary values according to the Dither matrix, and are produced as recording signals $S_R$. The recording signals $S_R$ are sent to the recording unit 9 and are recorded in a conventional manner.

In this case, if the electric picture signals Se are given gradations with the Dither matrix shown in FIG. 9(A), a photograph having very soft contrast can be obtained. If the electric picture signals Se are given gradations with the Dither matrix shown in FIG. 8(A), a photograph having relatively hard contrast can be obtained. Which one among a plurality of Dither matrices stored in the memory unit 7 should be used for gradation treatment may be determined by the user with reference to the original picture that is to be recorded, or may be automatically determined based upon the photograph picture data for each block.

In the present invention, the optical data signals So can be obtained by scanning the original by relatively moving the original placed on a predetermined position, and an optical scanning system consisting of a source of light, mirrors and lenses, like that of an electrophotographic reproducing machine. In this case, the original must be scanned to obtain the picture data for each block, and must also be scanned to record the picture data. Here, however, the picture data may be read by the forward scanning and recorded by the return scanning.

In the above-mentioned embodiment, the density histograms and cumulative density values were used to discriminate the picture data, i.e., to discriminate whether the data is that of a line picture or a photograph, for each block of the picture of the original. The discrimination method, however, need not be limited to these methods, but may be modified depending upon the contents of the original picture.

Figure 12:
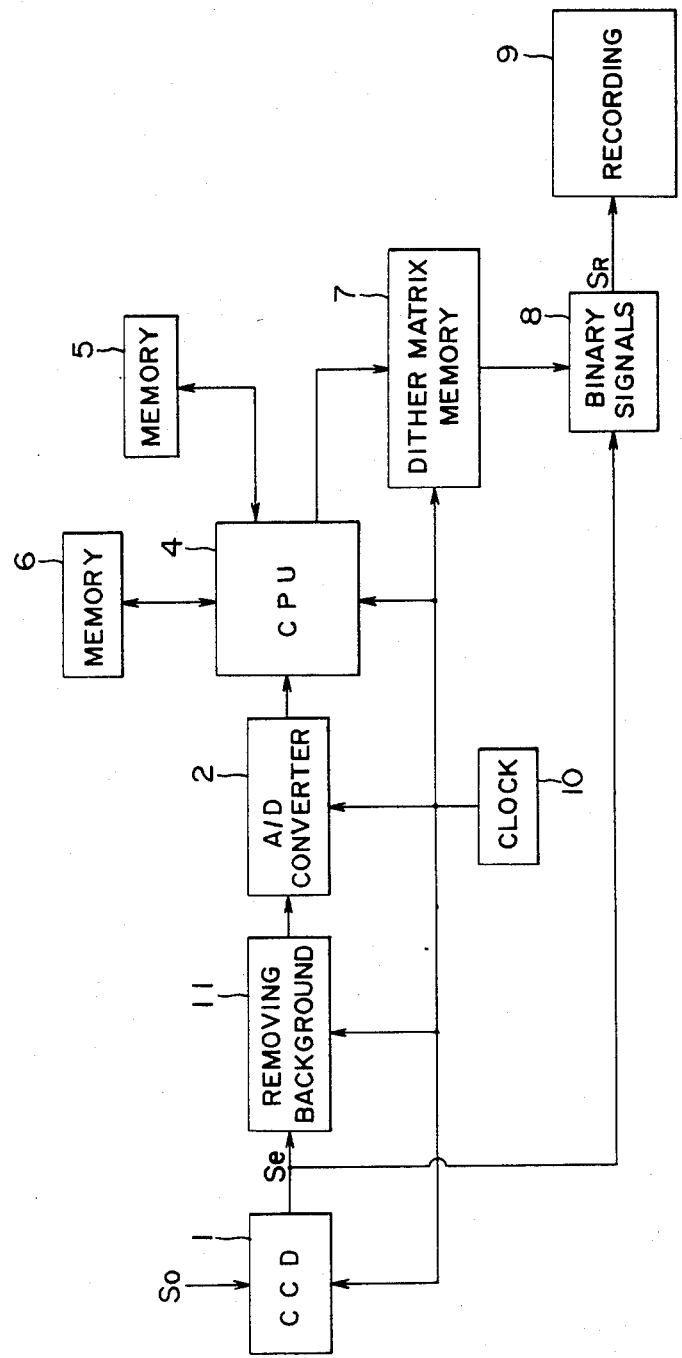
FIG. 12 is a diagram of a recording circuit for putting into practice the method of recording a picture image according to another embodiment of the present invention.

FIG. 12 illustrates a recording circuit for putting the method of recording a picture image according to another embodiment of the present invention into practice. The circuit setup of FIG. 12 is different from the circuit setup of FIG. 3 with regard to that a circuit 11 is provided to remove background data from the electric picture signals Se, and that no counter 3 is provided. The electric picture signals Se which contain no background data are converted into digital signals by the analog-to-digital converter 2, and are accumulated in the central processing unit (CPU) 4 for each block. The picture density data accumulated for each block are stored in the memory (RAM) 5 in the same manner as the embodiment of FIG. 3.

In this embodiment, a line picture and a photograph are discriminated as follows:

The cumulative value of picture density data accumulated and stored for each block are different depending whether it is a line picture or a photograph, as shown in FIG. 13.

A threshold value C is set as indicated by a broken line, and the picture data is discriminated to be that of a photograph when the cumulative value is greater than the threshold value C, and is discriminated to be that of a line picture when the cumulative value is smaller than the threshold value C. Thus, the picture data are found for each of the blocks N×M of the original, and are stored in the memory (RAM) 5.

The method of recording the picture based upon the thus found picture data was mentioned already with reference to FIG. 3, and is not described here.

According to the method of the present invention in which the picture signals are converted into binary signals using a Dither matrix, and the picture is recorded according to the binary signals as mentioned above, a plurality of dissimilar Dither matrices are prepared, picture density data is found for each block of the picture signals, and the picture signals are converted into binary signals using a Dither matrix which corresponds to the density data and which is selected from a plurality of Dither matrices to record the picture. When an original containing both line pictures and photographs is to be recorded, therefore, the gradation can be changed for each portion of the original, and the quality of the recorded picture can be improved.

What is claimed is:

1. In a method of recording a picture image by converting picture signals into binary signals using a matrix which has a plurality of threshold values with a predetermined frequency distribution arrayed according to a predetermined order and recording the picture according to the binary picture signals, the improvement wherein a plurality of matrix groups with different frequency distributions of threshold values are prepared, the picture to be recorded is divided into a plurality of picture regions to obtain picture density data for each of the regions, matrices corresponding to the picture density data detected for each of the regions are selected among said plurality of matrix groups, and the picture signals are converted into binary signals using said selected matrices.

2. In a method of recording a picture image by converting picture signals into binary signals using a matrix which has a plurality of threshold values with a predetermined frequency distribution arrayed according to a predetermined order and recording the picture according to the binary picture signals, the improvement wherein whether the picture to be recorded is a photograph or a line picture is discriminated based upon density data obtained from said picture that is to be recorded, the picture signals are converted into binary signals using said matrix when the picture is a photograph, and the picture signals are simply converted into binary signals without using a matrix when the picture is a line picture.

3. A recording apparatus for recording picture image characterized by comprising a memory circuit for memorizing a plurality of matrix groups each having a plurality of threshold values with a predetermined density distribution arrayed according to a predetermined order, means for dividing a picture image to be recorded into a plurality of picture regions and obtaining picture density data for each of the regions, matrix selecting means for selecting from said plurality of matrix groups memorized in said memory circuit matrices corresponding to the picture density data detected for each of the regions, and a comparator for comparing each picture element level of electric signals indicating a picture image information with each threshold value of said matrix selected by said matrix selecting means and thus generating an output binary signals thereof.

4. A recording apparatus according to claim 3 wherein said means for obtaining picture density data for each of said regions discriminates whether said data is substantially a tonal rendition or substantially a line rendition, and wherein said matrix selecting means operates to select a matrix only for a region in which the data is substantially a tonal rendition.

* * * * *